C. L. COFFIN.
METHOD OF ELECTRIC ARC WELDING, HEATING, AND METAL WORKING, AND APPARATUS THEREFOR.
APPLICATION FILED FEB. 7, 1917.
1,244,705. Patented Oct. 30, 1917.
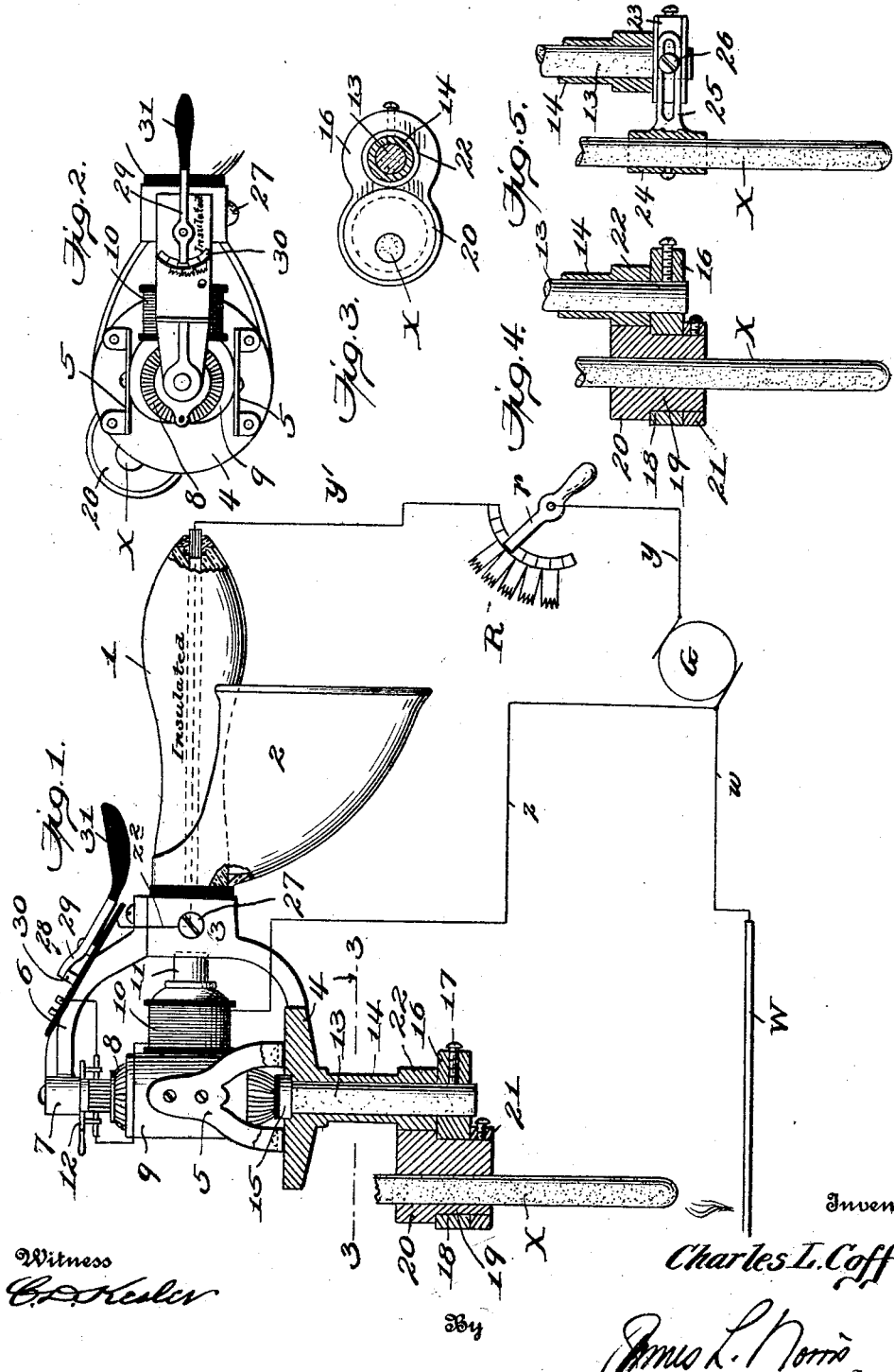
Witness
C. D. Kesler
Inventor
Charles L. Coffin
By
James L. Norris
Attorney

UNITED STATES PATENT OFFICE.

CHARLES L. COFFIN, OF PARKS, GEORGIA, ASSIGNOR TO ELECTRIC METAL WORKING CO., OF DETROIT, MICHIGAN, A CORPORATION OF MICHIGAN.

METHOD OF ELECTRIC-ARC WELDING, HEATING, AND METAL-WORKING, AND APPARATUS THEREFOR.

1,244,705. Specification of Letters Patent. Patented Oct. 30, 1917.

Continuation of application Serial No. 89,128, filed April 5, 1916. This application filed February 7, 1917. Serial No. 147,188.

*To all whom it may concern:*

Be it known that I, CHARLES L. COFFIN, a citizen of the United States, residing at Parks, in the county of White and State of Georgia, have invented new and useful Improvements in Methods of Electric-Arc Welding, Heating, and Metal-Working, and Apparatus Therefor, of which the following is a specification.

The present invention relates to an improved method of welding and heating metals by means of the electric arc, and apparatus therefor. The primary object of the invention is to utilize the direct heat of the electric arc, while in contact with the material to be heated, by causing the material to be made one electrode of the arc and an extraneous conductor the other electrode of the arc, and to more uniformly and broadly distribute the heating action of the arc, the arc is caused to describe a path upon the material in the manner hereinafter described. For this purpose, a tool or electrode holder is provided which is so constructed and arranged that an extraneous electrode may be made to describe a path of motion over the material, thus causing the arc to travel in a path over the material and thereby distribute its heating effect. In its simplest form of application, the electrode and, conjointly, the arc, may be made to describe a simple path, such as a circle; but to more thoroughly distribute the heating action of the arc the electrode is caused to describe two paths of motion, that is to say, it is caused to revolve about one axis, and also to revolve or move independently in a path of its own while describing the first-mentioned path. I have found that if the electrode is made to revolve while moving over a prearranged path, there is less fluctuation or disturbance of the arc, and this fact may be used to advantage in more broadly distributing the heating action of the arc, as in the arrangement hereinafter described.

In the present practice of welding by an electric arc sprung between the material and an extraneous conductor, the operator, to avoid overheating or burning the material, or even puncturing it with the arc, is compelled to move the electrode about rapidly by hand, generally causing the electrode to describe a circle of greater or less diameter and with varying speed as may be required. This procedure is laborious, exacting, and requires great muscular exertion and skill on the part of the operator, more especially when engaged in an operation of considerable magnitude.

My present invention obviates this and provides a method simple and easily applied by purely mechanical means in a tool carried in the hand, simplifying the welding operation, preventing overheating, and making results more certain.

The present application is a continuation of my co-pending application, Serial No. 89,128, filed April 5, 1916.

In the accompanying drawing:

Figure 1 shows in side elevation, partly in section, a hand tool for electric arc welding, heating, and metal working embodying the present invention, the electric circuits therefor being shown diagrammatically.

Fig. 2 is a top plan view of the tool as shown in Fig. 1.

Fig. 3 represents a section on the line 3—3 of Fig. 1.

Figs. 4 and 5 are detail sectional views showing modifications of the invention.

Similar parts are designated by the same reference characters in the several views.

Preferably, and as shown, the tool comprises an insulated handle 1 provided with a shield or guard 2 to protect the hand of the operator while grasping the handle. A sleeve 3 is secured to one end of the handle and it has a forwardly extended bracket 4 and a pair of supports 5 which extend upwardly therefrom. A bracket 6 is secured to the sleeve 3, and it provides a bearing 7 for the upper end of the shaft of an armature 8, this armature forming part of an electric motor the pole pieces 9 of which are secured to the supports 5, these pole pieces having field coils 10 thereon, and the motor has a stud 11 which is seated in the sleeve 3. By the construction just described, the pole or field pieces of the motor are supported in fixed relation to the handle and its connected parts while the armature 8 of the motor is revoluble. 12 designates the brush holder of the motor. The lower end 13 of the armature shaft extends downwardly through a sleeve 14 which is a continuation of the bracket 4, and the armature shaft is provided with a collar 15 which sustains downward or end thrust on the armature shaft. An arm 16 is secured by a set-screw 17 or other suitable means to the lower end of the armature shaft, and, in the construction shown in Figs. 1, 3 and 4, this arm is bored vertically to form a bearing 18. An electrode holder 19 is revolubly fitted in the bearing 18 of the arm 16, it having a friction collar 20 thereon at the upper side of the arm 16 and a separately formed collar 21 secured at the under side of the arm 16 whereby the electrode holder is revoluble in the bearing 18 and endwise displacement of the electrode holder relatively to the arm 16 is prevented. During the operation of the tool, rotation of the armature shaft causes rotation of the arm 16 about the axis of the armature shaft. Such motion of the arm 16 will cause the electrode holder to travel in a circular path the axis of which is coincident with the axis of the armature shaft. In the construction shown in Figs. 1, 3 and 4, rotation is imparted to the electrode holder to cause rotation of the electrode carried thereby. As shown, the electrode holder is driven frictionally during rotation of the arm 16, such being accomplished by the collar 20 on the electrode holder engaging frictionally and traveling around a circular collar 22 formed on the lower portion of the extension 14 of the bracket 4. In Figs. 1 and 2, the electrode holder is bored eccentrically of its axis of rotation and is fitted with an electrode X. In Fig. 4, the electrode holder is bored concentrically of its axis of revolution to receive the electrode X. In some instances, however, where extensive distribution of the heat of the arc is unnecessary, a construction such as shown in Fig. 5 may be used. In this instance, a bracket 23 is fixed to the lower end 13 of the armature shaft, and an electrode holder 24 is employed which has a slide 25 which is secured adjustably to the bracket 23 by a clamping screw or equivalent device 26 whereby the distance of the electrode X in the electrode holder 24 from the center of the armature shaft may be varied and, in consequence, the electrode may be caused to describe circles of different diameters.

As shown in Fig. 1, the work or material W to be operated on serves as one of the electrodes of the arc, it being connected by the conductor $w$ to one terminal of a generator or other source of electric current supply G, and the conductor $y$ leads from the other terminal of the generator to the controlling arm $r$ of a hand-controlled rheostat R, the conductor $y'$ leading from the rheostat through the insulated handle of the tool to a screw 27 whereby current is conducted to the sleeve 3 and from the latter it passes through the bracket 4, the extension 14 of the bracket to the electrode holder 19, and from the latter to the electrode X, the circuit being completed by the arc sprung between the electrode and the work or material under treatment. The electric motor is preferably connected in shunt with the arc circuit. As shown, the motor receives current from one terminal of the generator G through a conductor $z$ which leads to the field coils 10 of the motor, thence through the brushes and armature windings of the motor, and the motor circuit is completed through a starting and speed-controlling rheostat 28 which is secured to the bracket 6 and embodies a switch lever 29 adapted to coöperate with the resistance contacts 30, the switch lever having an insulated handle 31 which may be manipulated conveniently by the thumb of the hand grasping the handle 1. The motor circuit is completed from the starting and speed-controlling rheostat to the other terminal of the generator by a conductor $z^2$ leading to the screw 27, the latter being electrically connected to the conductor $y'$.

In practice, the mode of procedure is as follows: The hand tool and the work being connected to the generator or other suitable source of electrical energy as described and with all of the resistance of the rheostat R in circuit, the operator manipulates the tool to bring the electrode X into contact with the material W. This completes the electric circuit, the current then flowing from the generator through the conductor $w$ to the work W, thence through the electrode X and the electrode holder 19 to the extension 14, and from the latter through the bracket 4 and sleeve 3 to the screw 27, the current then flowing through the conductor $y'$, through the rheostat R, and returning through the conductor $y$ to the opposite terminal of the generator. After the circuit has been thus completed, the operator withdraws the electrode gradually from the work, thereby establishing an arc between the work and the electrode. During the withdrawal of the electrode from the work, the resistance of the rheostat R is cut out of the circuit by manipulation of the controlling or switch lever $r$, this being continued until the arc has assumed the desired volume. The motor is then started into operation by manipulation of the handle 31 connected to the switch lever 29 of the starting and speed-controlling rheostat of the motor, thereby cutting out of the motor circuit resistance until the motor revolves at the desired speed. Rotation of the motor armature causes rotation of the arm 16 connected thereto and carrying the electrode holder 19, and while the electrode holder revolves about the axis of the armature shaft, it is also caused to revolve in its bearing 18 by the frictional engagement of the collars 20 and 22, the collar 20 on the electrode holder traveling around the stationary collar 22. In the arrangement shown in Figs. 1 and 2, the electrode is mounted in the electrode holder eccentrically of the axis of the bearing 18 and, in consequence, the electrode will describe a relatively small circular path about the axis of the electrode holder while it coincidently describes a larger circle about the axis of the armature shaft. It will therefore be understood that, in this embodiment of the invention, the electrode describes two paths of motion over the work or material, causing the heating effect of the arc to be distributed evenly and uniformly during the travel of the arc and without requiring effort on the part of the operator, the operator being at liberty to shift the tool about as different portions of the work are to be heated, thereby avoiding the tiresome and exacting labor of causing the electrode to describe paths or circles over the work by manual manipulation, as is the present practice to distribute the heating effect of the arc.

In such cases where extensive distribution of the heat of the arc is unnecessary, the electrode may be mounted concentrically with the axis of revolution of the electrode holder, as is the case in Fig. 4. In this instance, the electrode revolves on its own axis or on an axis coincident with the axis of revolution of the electrode holder while the electrode describes a circular path about the armature axis as a center. In both instances, however, the electrode revolves relatively to the axis of the electrode holder, and this causes the arc to be much steadier and less liable to fluctuation or disturbance. In other cases, it will be sufficient to move the arc in a circular path about the armature shaft as an axis without imparting an independent rotation of the electrode, such an arrangement being shown in Fig. 5.

I claim as my invention:—

1. The method of arc welding and heating, consisting in subjecting the material to the heating action of an electric arc, and causing the arc to revolve about an axis and to also revolve independently of such axis.

2. The method of arc welding and heating, consisting in subjecting the material to the heating action of an electric arc maintained between the material and an extraneous electrode and coincidently revolving said electrode about one axis while revolving about a second axis to distribute the heating effect of said arc.

3. In the art of electric arc welding, heating and metal working, providing an arc between the material to be heated and an extraneous electrode, and distributing the heating effect of the arc by coincidently imparting to the extraneous electrode two paths of motion over the material.

4. In the art of electric arc welding, heating and metal working, maintaining an arc between the material to be heated and an extraneous electrode, and distributing the heating effect of the arc by coincidently giving the arc two paths of motion over the material.

5. The method of distributing the heating action of the arc in arc welding, consisting in providing an arc between the material to be heated and an extraneous electrode, and coincidently giving the arc two paths of motion over the material.

6. The method of distributing the heating action of the arc and securing steadier action of the arc flame in arc welding and heating, consisting in providing an arc between the material to be heated and an extraneous electrode, and coincidently revolving the said extraneous electrode about one axis while said electrode revolves about a second axis.

7. An arc welding hand tool comprising a support, an electrode movably mounted thereon, means for connecting said electrode to a source of electric energy, and means for coincidently imparting to said electrode two paths of motion over the material.

8. An arc welding hand tool comprising a support, an electric motor connected to a source of electric energy and carried on said support, an electrode connected to a source of electric energy and adapted to be revolved by said motor, and means for varying the speed of revolution of the electrode.

9. An arc welding hand tool comprising a support, an electric motor, means for including the motor in an electric circuit, an electrode for the arc, means for supporting the electrode, means for connecting the electrode to a source of electric energy, and means for revolving said electrode by said motor.

10. An arc welding hand tool comprising a support, an electric motor, a circuit including the motor, and means for varying the speed of the motor, an electrode for the arc, means for supporting the electrode, means for connecting the electrode to a source of electric energy, and means for imparting to the electrode a path of motion over the material.

11. An arc welding hand tool comprising a support, an electric motor, a circuit including the motor, and means for controlling the motor, an electrode for the arc, means for supporting the electrode, means connecting the electrode to a source of electric energy, and means for imparting to the electrode two paths of motion over the material.

12. An arc welding hand tool comprising a support, an electric motor, a circuit including the motor, and means for controlling the motor, an electrode for the arc so mounted upon said motor shaft as to revolve concentrically with the axis of revolution, and means for varying the distance of the electrode from the axis of revolution.

13. An arc welding hand tool comprising a support, an electric motor, a circuit including the motor, and means for controlling the motor, an electrode for the arc carried upon the armature shaft of said motor in such manner as to revolve the arcing end of said electrode in a circle concentric with the axis of revolution of the armature shaft, and means for varying the diameter of such concentric circle of revolution.

14. An arc welding hand tool comprising a support, an electric motor, a circuit including the motor, and means for controlling the motor, an electrode for the arc adapted to revolve concentrically with the axis of revolution of the armature shaft of said motor, and means for causing the electrode to revolve upon an independent axis during its revolution about the axis first mentioned.

15. An arc welding hand tool comprising a support, an electrode for the arc, means for supporting the electrode, means connecting the electrode to a source of electric energy, and means for revolving the electrode while imparting to the electrode a path of motion over the material.

16. In an apparatus for arc welding and heating, the combination of a source of electric energy, two electrodes in circuit therewith, one of the electrodes comprising the material to be heated, said electrodes adapted to maintain an electric arc between them, means for regulating said arc, a support carrying one of the electrodes, and means for revolving the last-mentioned electrode about an axis while coincidently revolving it about a second axis.

17. In an apparatus for arc welding and heating, the combination of a source of electric energy, two electrodes in circuit therewith, one of said electrodes comprising the material to be heated, said electrodes adapted to maintain an electric arc between them, means for regulating the arc, a support carrying one of the electrodes, means for revolving said latter electrode about an axis while coincidently revolving it about a second axis, and means for varying the speed of the moving electrode.

18. In an apparatus for arc welding and heating, the combination of a source of electric energy, two electrodes in circuit therewith, one of said electrodes comprising the material to be heated, said electrodes adapted to maintain an electric arc between them, means for regulating the arc, a support carrying one of the electrodes for manually operating it, and means for coincidently imparting to said latter electrode two paths of motion over the material.

19. In an apparatus for arc welding and heating, the combination of a source of electric energy, two electrodes in circuit therewith, one of said electrodes comprising the material to be heated, said electrodes adapted to maintain an electric arc between them, means for regulating the arc, a manually operable support having the other electrode movably mounted thereon, means for imparting to said latter electrode a path of motion about one axis and coincidently imparting thereto motion about a second axis, and means for varying the speed of the moving electrode.

In testimony whereof I have hereunto set my hand in presence of two subscribing witnesses.

CHARLES L. COFFIN.

Witnesses:
J. H. SWAN,
J. H. WELLS.

Copies of this patent may be obtained for five cents each, by addressing the "Commissioner of Patents, Washington, D. C."